United States Patent
Li et al.

(10) Patent No.: US 8,694,568 B2
(45) Date of Patent: Apr. 8, 2014

(54) METHOD FOR CALCULATING CAUSAL IMPULSE RESPONSE FROM A BAND-LIMITED SPECTRUM

(75) Inventors: Kezhou Li, Shanghai (CN); Jing Wang, Shanghai (CN); Jiayuan Fang, Saratoga, CA (US)

(73) Assignee: Sigrity, Inc., Campbell, CA (US)

( * ) Notice: Subject to any disclaimer, the term of this patent is extended or adjusted under 35 U.S.C. 154(b) by 522 days.

(21) Appl. No.: 13/091,666

(22) Filed: Apr. 21, 2011

(65) Prior Publication Data

US 2012/0269230 A1  Oct. 25, 2012

(51) Int. Cl.
*G06F 17/10* (2006.01)

(52) U.S. Cl.
USPC .......................................................... 708/300

(58) Field of Classification Search
USPC ................................................. 708/300–323
See application file for complete search history.

(56) References Cited

U.S. PATENT DOCUMENTS

| 5,163,028 | A  | * | 11/1992 | Barr et al. ........................ 367/13 |
| 2008/0281893 | A1 |   | 11/2008 | Rao |
| 2009/0006515 | A1 | * | 1/2009  | Grobert ......................... 708/300 |
| 2009/0281804 | A1 | * | 11/2009 | Watanabe et al. ............. 704/231 |

* cited by examiner

*Primary Examiner* — Tan V. Mai
(74) *Attorney, Agent, or Firm* — Kenyon & Kenyon LLP

(57) ABSTRACT

A computer-implemented method for calculating a time-domain impulse response with improved causality based on a first spectrum in a frequency domain is disclosed. The first spectrum may be band-limited. The method may calculate a first time-domain impulse response from the first spectrum. The method may remove a non-causal portion of the first system time-domain impulse response to obtain a second time-domain impulse response, and calculate a second spectrum of the second time-domain impulse response. The method may further modify the second spectrum by adding a causal signal such that a difference between the second spectrum and the first spectrum is reduced. The method may also calculate the time-domain impulse response with improved causality from the modified second spectrum.

23 Claims, 4 Drawing Sheets

METHOD FOR CALCULATING CAUSAL IMPULSE RESPONSE FROM A BAND-LIMITED SPECTRUM

DESCRIPTION OF THE INVENTION

1. Field of the Invention

This invention relates in general to methods for calculating causal impulse response, and more particularly, relates to methods for calculating causal impulse response from a band-limited spectrum.

2. Background

In signal processing, impulse response of a dynamic system is an important parameter that can be used to predict an output of the dynamic system from a known input. For example, the output can be calculated as a convolution of the input with the impulse response. Impulse response analysis is widely used in various applications, such as on control systems, digital filter designs, electronic processing, acoustic and audio applications. Most of these applications involve causal systems. A causal system is a system where the output depends on past/current inputs but not future inputs.

In many applications, a system impulse response is usually measured in a frequency domain, as a spectrum of an impulse response. In order to derive the impulse response for a time-domain simulation, an inverse fast Fourier transform (IFFT) can be applied to the spectrum. Since the spectrum measurement is typically within a limited bandwidth, the inverse fast Fourier transform of such a truncated spectrum will lead to a non-causal impulse response.

Spectrum extrapolation is typically used to obtain a more accurate causal impulse response. Conventional methods, such as, linear extrapolation and window function, often violate causality and lead to a significant discrepancy between the spectrum of the impulse response and the original spectrum.

Therefore, it may be desirable to have a method for calculating causal system impulse response from a band-limited spectrum.

SUMMARY

Consistent with embodiments of the present invention, a computer-implemented method for calculating a time-domain impulse response with improved causality based on a first spectrum in a frequency domain is disclosed. The first spectrum may be band-limited. The method may calculate a first time-domain impulse response from the first spectrum. The method may remove a non-causal portion of the first time-domain impulse response to obtain a second time-domain impulse response, and calculate a second spectrum of the second time-domain impulse response. The method may further modify the second spectrum by adding a causal signal such that a difference between the second spectrum and the first spectrum is reduced. The method may also calculate a time-domain impulse response with improved causality from the modified second spectrum.

Consistent with embodiments of the present invention, a non-transitory computer-readable medium storing instructions, when executed by a processor, perform the method described above is provided.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate disclosed embodiments described below.

In the drawings.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
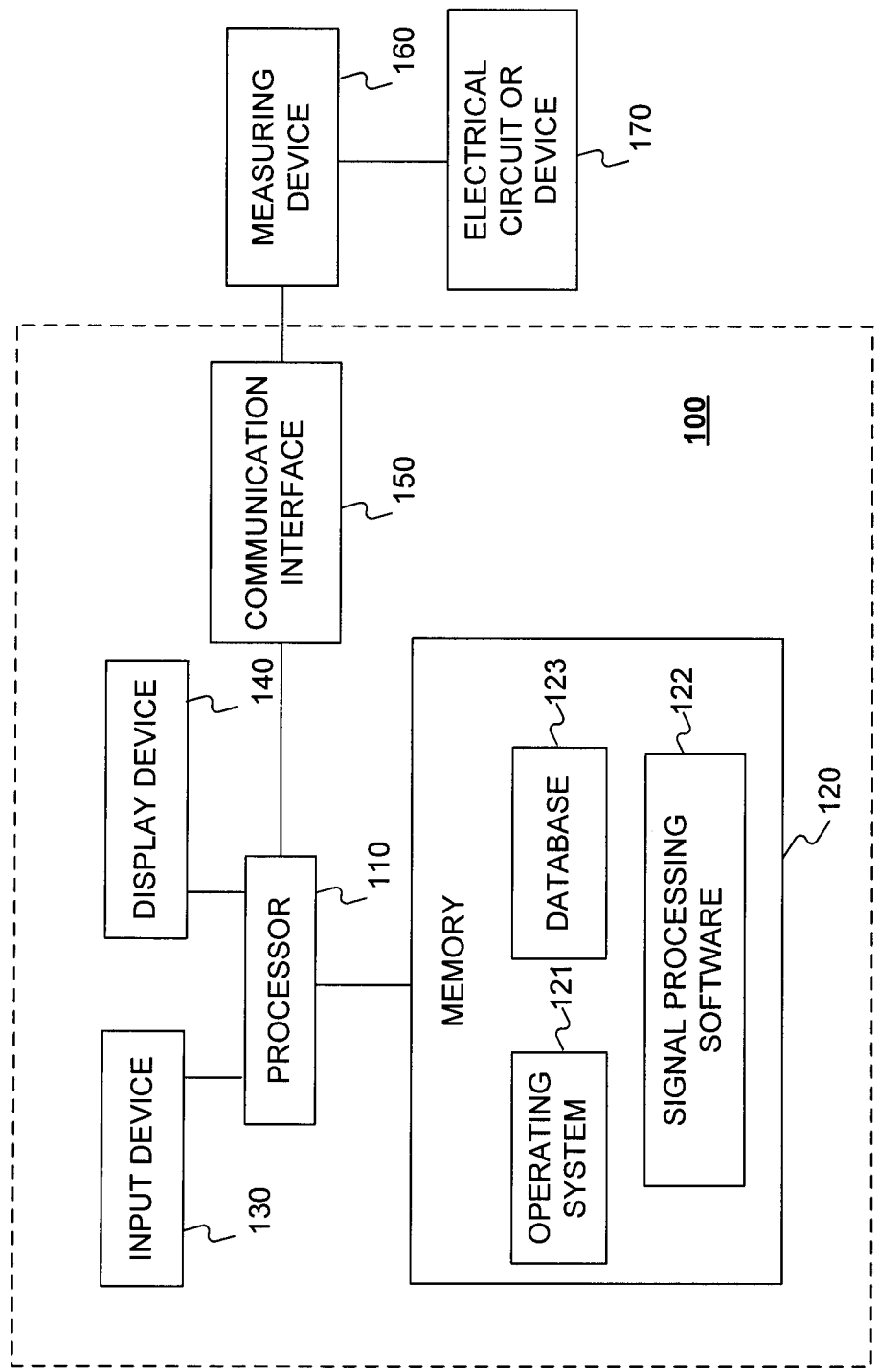
FIG. 1 shows an exemplary apparatus for calculating a system time-domain impulse response, consistent with certain disclosed embodiments.

FIG. 1 shows an exemplary apparatus 100 for calculating a system time-domain impulse response. Consistent with some embodiments, apparatus 100 may be a general purpose computer, or a computing device dedicated for processing data. As shown in FIG. 1, apparatus 100 may include a processor 110, a memory module 120, a user input device 130, a display device 140, and a communication interface 150. Processor 110 can be a central processing unit ("CPU") or a graphic processing unit ("GPU"). Depending on the type of hardware being used, processor 110 can include one or more printed circuit boards, and/or a microprocessor chip. Processor 110 can execute sequences of computer program instructions to perform various methods that will be explained in greater detail below.

Memory module 120 can include, among other things, a random access memory ("RAM") and a read-only memory ("ROM"). The computer program instructions can be accessed and read from the ROM, or any other suitable memory location, and loaded into the RAM for execution by processor 110. For example, memory module 120 may store one or more software applications. Software applications stored in memory module 120 may comprise operating system 121 for common computer systems as well as for software-controlled devices. Further, memory module may store an entire software application or only a part of a software application that is executable by processor 110.

In some embodiments, memory module 120 may store signal processing software 122 that may be executed by processor 110. For example, signal processing software 122 may be executed to calculate a system time-domain impulse response with improved causality from an existing spectrum.

It is also contemplated that signal processing software 122 or portions of it may be stored on a removable computer readable medium, such as a hard drive, computer disk, CD-ROM, DVD ROM, CD±RW or DVD±RW, USB flash drive, memory stick, or any other suitable medium, and may run on any suitable component of apparatus 100. For example, portions of applications to perform impulse response simulation may reside on a removable computer readable medium and be read and acted upon by processor 110 using routines that have been copied to memory 120.

In some embodiments, memory module 120 may also store master data, user data, application data and/or program code. For example, memory module 120 may store a database 123 having therein various time-domain and spectrum data used for calculating the impulse response.

In some embodiments, input device 130 and display device 140 may be coupled to processor 110 through appropriate interfacing circuitry. In some embodiments, input device 130 may be a hardware keyboard, a keypad, or a touch screen, through which a user may input information to apparatus 100. Display device 140 may include one or more display screens that display the time-domain and spectral signals or any related information to the user.

Communication interface 150 may provide communication connections such that apparatus 100 may exchange data with external devices. For example, apparatus 100 may be connected with an external measuring device 160 that measures an S parameter of an electrical circuit or device 170. Consistent with some embodiments, electrical circuit or device 170 may comprise various interconnected basic electrical circuit components or lumped elements such as resistors, capacitors, inductors, and/or transistors. In some embodiments, electrical circuit or device 170 may also include many typical communication system components such as amplifiers, attenuators, filters, couplers, and/or equalizers.

Consistent with some embodiments, electrical circuit or device 170 may have any number of ports. Ports are the terminals through which electrical circuit or device 170 communicate with other devices. For example, through the ports, electrical currents may either enter or exit electrical circuit or device 170. S-parameter measurements may be made at these ports. The S-parameter may vary at different frequencies, and thus, the measurements may form a signal spectrum. At each frequency of the spectrum, the S-parameter is represented by a unitless complex number indicative of amplitude and phase.

Figure 2:
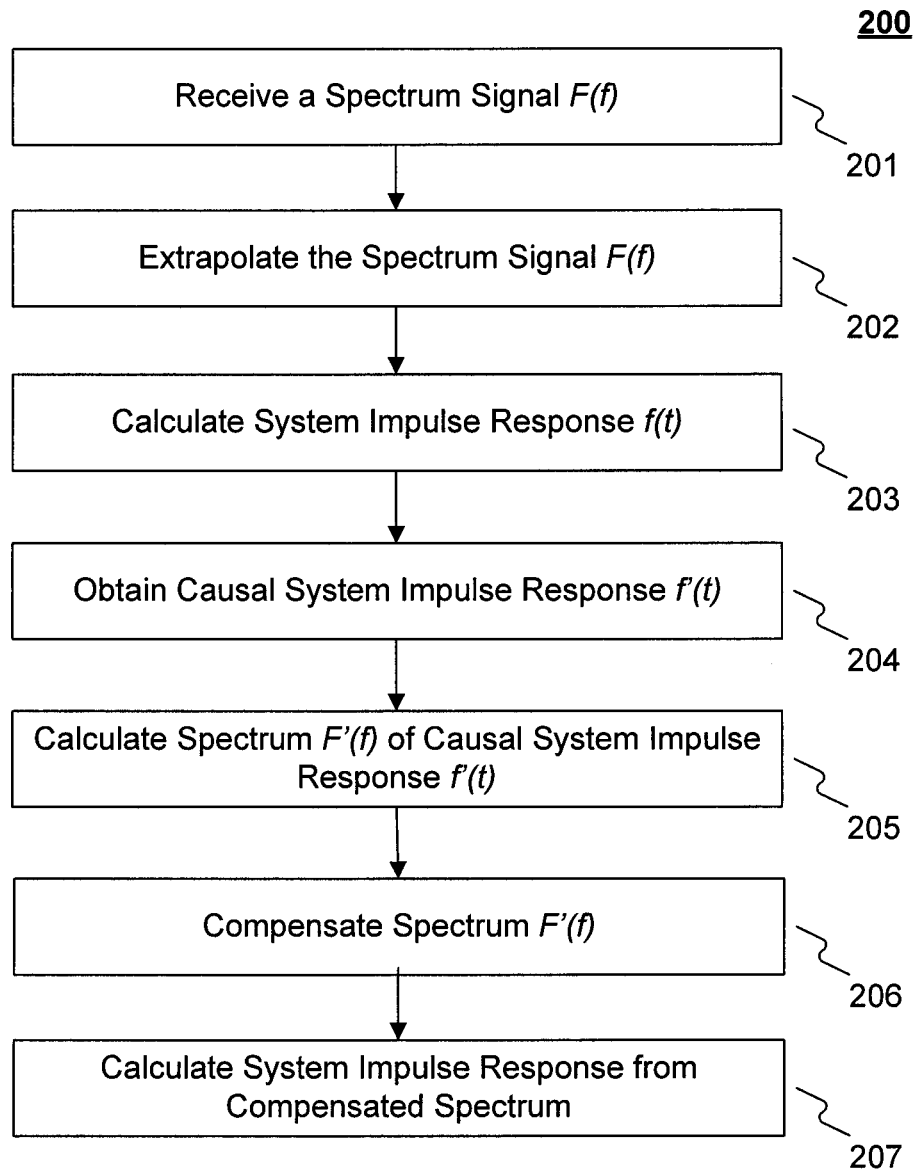
FIG. 2 shows a flow chart of an exemplary process for calculating a system time-domain impulse response from an existing band-limited spectrum, consistent with certain disclosed embodiments.

One or more components of apparatus 100 may be used to implement a process related to signal processing. For example, FIG. 2 shows a flow chart of an exemplary process 200 for calculating a system time-domain impulse response from a band-limited spectrum.

Figure 3:
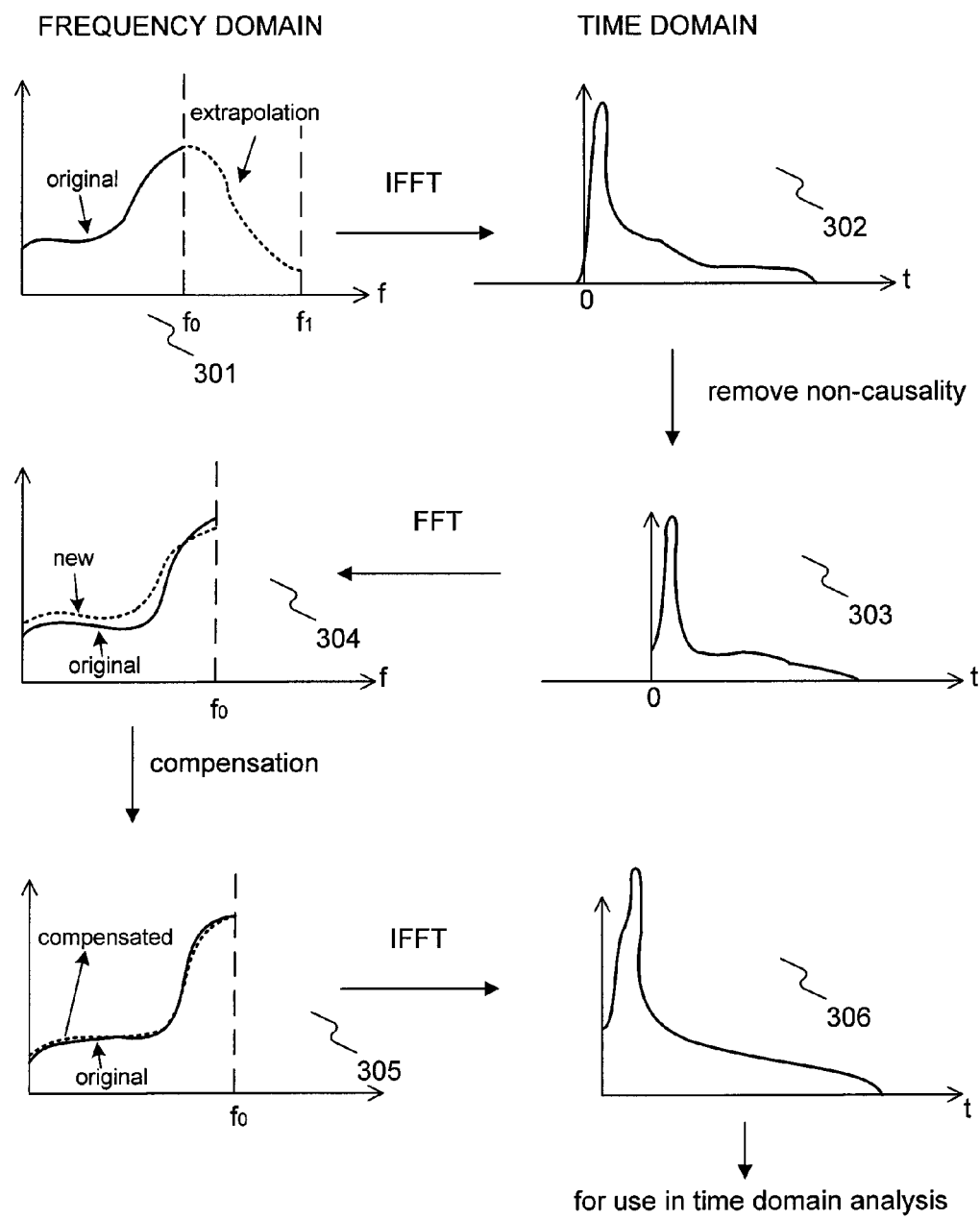
FIG. 3 illustrates an exemplary process of calculating a system time-domain impulse response from an existing band-limited spectrum, consistent with the disclosed embodiments of FIG. 2.

Process 200 may begin when a spectrum signal F(f) is received (step 201). For example, the spectrum signal may be received from external measuring device 160, and transmitted to apparatus 100. The spectrum may represent measurements of a characteristic, such as voltage or current, of an electrical circuit or device. In some embodiments, the spectrum signal may be a series of S-parameters measured at different frequencies. The spectrum signal may be band-limited, i.e., truncated at a cut-off frequency lower than Nyquist frequency. For example, chart 301 of FIG. 3 shows an original spectrum signal $F_{org}(f)$ that is cut off at frequency $f_0$. In some embodiments, the apparatus 100 may generate the spectrum based on the results of measurements of a characteristic of an electrical circuit or device.

In step 202, the band-limited spectrum signal may be extrapolated. For example, chart 301 of FIG. 3 shows an original spectrum signal that is extrapolated to frequency $f_1$. In some embodiments, $f_1$ may be the Nyquist frequency, but $f_1$ may be any suitable frequency higher than the cut-off frequency $f_0$. In some embodiments, $f_1$ may be adaptively determined based on features of the spectrum signal. Various extrapolation methods may be used in step 202. Preferably, the extrapolation function may satisfy continuity at cut-off frequency $f_0$ and Hilbert transform to maintain causality.

In some embodiments, a rational function, which satisfies Hilbert transform, may be employed as the extrapolation function. For example, a rational function $R_{0, 1, \ldots, m}$, where the subscript indicates that it passes through the m+1 sampling points, the highest m+1 frequencies, of the original spectrum signal $F_{org}(f)$, may be employed. Assuming $(x_0, y_0)$, $(x_1, y_1), \ldots, (x_m, y_m)$ are the m+1 sample points, the rational function may be described using Equation (1) below.

$$R_{0,1,\ldots,m}(x) = \frac{1 + p_1 x + \ldots + p_u x^u}{q_0 + q_1 x + \ldots + q_v x^v} \quad (1)$$

where m=u+v, where v=u+1 if m is odd, and v=u if m is even. With such an extrapolation function, the function passing through n+1 points may be derived recursively from the functions passing through n and n−1 points using Equation (2). That is, a higher order rational function may be generated from lower order rational functions.

$$R_{0,1,\ldots,n}(x) = \quad (2)$$

$$R_{1,\ldots,n}(x) + \frac{R_{1,\ldots,n}(x) - R_{0,1,\ldots,n-1}(x)}{\left(\frac{x - x_0}{x - x_n}\right)\left(1 - \frac{R_{1,\ldots,n}(x) - R_{0,1,\ldots,n-1}(x)}{R_{1,\ldots,n}(x) - R_{1,\ldots,n-1}(x)}\right) - 1}$$

with the initial condition that, the first order function $R_i = y_i$, where $y_i$ is the complex spectrum value at frequency $x_i$ and the zero order function R=0 when n<0. With the first order function and the zero order function defined as in the initial condition, second order functions $R_{0, 1}, R_{1, 2}, R_{2, 3}, R_{3, 4}, \ldots$, may be calculated. Similarly, higher order functions may be recursively calculated. Once $R_{0, 1, \ldots, n}$ is derived, the extrapolated spectrum $F_{ext}(f)$ may be calculated for frequencies within the range from $f_0$ to $f_1$, such that the whole spectrum may be described by Equation (3).

$$F_{all}(f) = \begin{cases} F_{org}(f) & f \leq f_0 \\ F_{ext}(f) & f_0 \leq f \leq f_1 \end{cases} \quad (3)$$

In step 203, the whole spectrum after extrapolation may be transformed into the time-domain to obtain an impulse response f(t). In some embodiments, an inverse Fourier transform or its discrete version, inverse Fast Fourier transform (IFFT), may be performed in step 203. For example, chart 302 of FIG. 3 illustrates the impulse response in the time-domain obtained through IFFT. In step 204, a causal impulse response f'(t) may be obtained. In some embodiments, a non-causal signal portion may be reduced or substantially removed from impulse response f(t) to improve causality of the signal. For example, as shown in chart 303 of FIG. 3, the signal portion at t<0 may be removed. Accordingly, the resulted impulse response f'(t) becomes causal.

Erasing the portion of the impulse response at t<0 may affect the spectrum of the impulse response. The impact can be seen by transforming the causal impulse response to a frequency spectrum and comparing the obtained spectrum with the original spectrum. For example, the causal impulse response f'(t) may be transformed back to the frequency domain by a Fourier transform or its discrete version, Fast Fourier transform (FFT) in step 205. The obtained spectrum F'(f) may be different from $F_{org}(f)$ at frequencies below $f_0$. For example, as shown in chart 304 of FIG. 3, there is a discrepancy between the new spectrum representing F'(f) and the original spectrum representing $F_{org}(f)$. A spectrum compensation may be performed to reduce the difference between F'(f) and $F_{org}(f)$ (step 206). Chart 305 of FIG. 3 shows a compensated spectrum which more closely approximates the original spectrum.

In some embodiments, the compensation may be performed on the entire spectrum from f=0 to f=$f_0$. For example, a causal compensation function $F_{comp}(f)$ may be determined that approximates the difference spectrum such that $$F_{comp}(f) \approx F_{dif}(f) = F_{org}(f) - F'(f), \text{ for } f \leq f_0 \quad (4)$$

In some embodiments, the compensation function $F_{comp}(\omega) = 2\pi f$ may be defined by using a set of basis functions, such as, $$\{1, e^{-j\omega\Delta t}, e^{-j\omega 2\Delta t}, e^{-j\omega 3\Delta t}, \ldots e^{-j\omega(N-1)\Delta t}\} \quad (5)$$

where $\Delta t$ is the time-domain sampling interval in FFT, and N is the number of sampling points in the original spectrum. It is contemplated that the compensation function may include a subset of the basis functions of set (5). Accordingly, the compensation function $F_{comp}$ can be represented as $$F_{comp}(\omega) = a_0 + a_1 e^{-j\omega\Delta t} + a_2 e^{-j\omega 2\Delta t} + \ldots + a_{N-1} e^{-j\omega(N-1)\Delta t} \quad (6)$$

The basis functions have causal time-domain counterparts by nature, i.e., $$f_b(t) = IFFT(e^{-j\omega n\Delta t}) = \begin{cases} 1 & t = n\Delta t \\ 0 & t \neq n\Delta t \end{cases} \quad (7)$$

where n is an integer, and $0 \leq n < N$ and thus, IFFT($F_{comp}$) has no response at t<0. Therefore, adding $F_{comp}$ to F'(f) will not bring in any non-causality in time-domain. That is, the impulse response corresponding to the compensated spectrum remains causal.

The real coefficients $a_0, a_1, \ldots, a_{N-1}$ in Equation (6) may be determined by minimizing the difference between $F_{dif}(\omega)$ and $F_{comp}(\omega)$. In some embodiments, the difference may be defined as a global minimum error, i.e., a collective error at all frequencies. For example, the difference may be an absolute error (norm-1), a least square (norm-2), or even higher norm errors. For example, the coefficients may be determined by using a least square method to minimize the value of expression (8).

$$\sum_{\omega=\omega_0}^{\omega_{N-1}} [F_{dif}(\omega) - (a_0 + a_1 e^{-j\omega\Delta t} + a_2 e^{-j\omega 2\Delta t} + \ldots + a_{N-1} e^{-j\omega(N-1)\Delta t})]^2 \quad (8)$$

In some embodiments, an absolute error control may be performed at predetermined frequencies. For example, a positive real weight function $W(\omega)$ may be applied to weight the difference between $F_{dif}(\omega)$ and $F_{comp}(\omega)$. The coefficients may also be determined by using a least square method to minimize the value of expression (9).

$$\sum_{\omega=\omega_0}^{\omega_{N-1}} W(\omega)[F_{dif}(\omega) - (a_0 + a_1 e^{-j\omega\Delta t} + a_2 e^{-j\omega 2\Delta t} + \ldots + a_{N-1} e^{-j\omega(N-1)\Delta t})]^2 \quad (9)$$

Accordingly, emphasis may be given to particular frequencies, or a range of frequencies. The larger $W(\omega)$ is, the smaller error may be at the corresponding frequency. As an example, by defining $W(\omega) = e^{-\omega}$, low frequencies are given more weight than high frequencies, and errors at lower frequencies may be smaller than those at higher frequencies.

Figure 4:
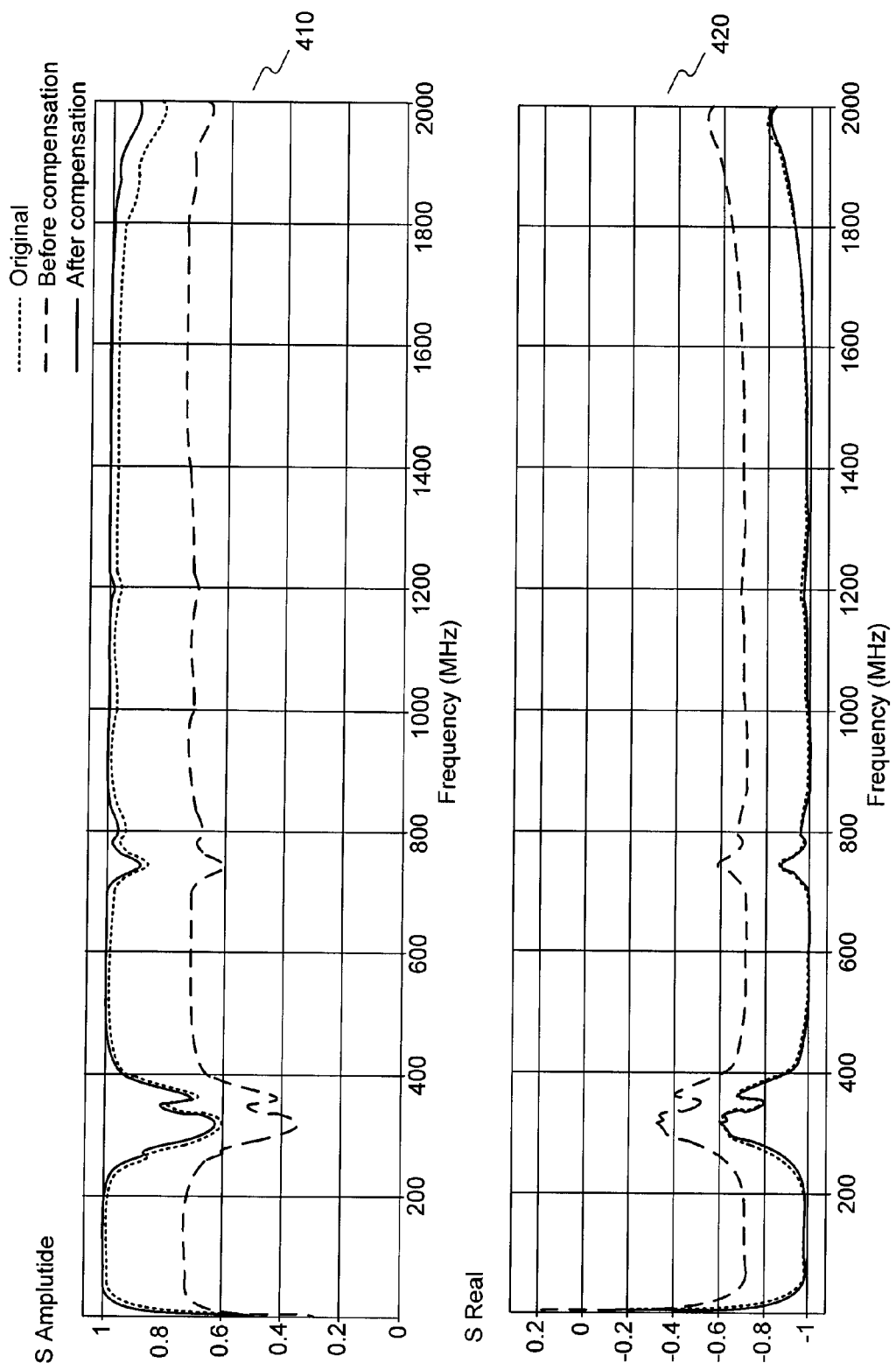
FIG. 4 shows an exemplary spectrum of a system time-domain impulse response before and after spectrum compensation, consistent with certain disclosed embodiments.

In some embodiments, the compensation may be carried out to correct a DC component, i.e., at f=0. For example, the real part of spectrum F'(f) may be shifted by a constant value $\Delta F = F_{org}(0) - F'(0)$. For example, FIG. 4 shows an exemplary spectrum of a frequency-domain impulse response before and after spectrum compensation. Chart 420 illustrates the real parts of the S-parameters in the original spectrum, spectrum before compensation, and the spectrum after compensation. The spectrum before compensation is shifted down such that the real part value at f=0 matches the original spectrum. Accordingly, chart 410 shows the amplitude of the S-parameters in the original spectrum, spectrum before compensation, and the spectrum after compensation. It shows that after compensation, the difference between the compensated spectrum and the original spectrum is substantially reduced. Because such a DC shift in the spectrum does not add any non-causality to the time-domain signal, the compensated spectrum remains causal.

After spectrum compensation, the compensated spectrum $F_{comp} + F'$ may be transformed into the time-domain again to obtain a corrected impulse response (step 207). In some embodiments, an inverse Fourier transform or its discrete version, IFFT may be performed in step 207, according to Equation (10).

$$f'(t) = IFFT(F_{comp}(\omega) + F'(\omega)) \quad (10)$$

Because the non-causality in the original time-domain impulse response is reduced (step 204), and the subsequent spectrum compensation uses a causal signal which does not add any non-causality to the time-domain impulse response (step 206), the corrected impulse response has an improved causality compared to the original impulse response. In particular, if in step 204 the non-causal portion is removed from the time-domain impulse response, the corrected impulse response may be completely causal. For example, as shown in chart 306 of FIG. 3, the corrected impulse response has no signal when t<0. Process 200 may terminate after step 207.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for calculating a time-domain impulse response, comprising:
   calculating, by a processor, a first time-domain impulse response from a first spectrum in a frequency domain, wherein the first spectrum is a band-limited spectrum;

removing a non-causal portion of the first time-domain impulse response to obtain a second time-domain impulse response;

calculating, by the processor, a second spectrum of the second time-domain impulse response;

modifying, by the processor, the second spectrum by adding a causal signal such that a difference between the second spectrum and the first spectrum is reduced; and calculating, by the processor, the time-domain impulse response from the modified second spectrum.

2. The method of claim 1, wherein removing a non-causal portion of the first time-domain impulse response to obtain a second system time-domain impulse response includes removing the portion of the first time-domain impulse response where t<0.

3. The method of claim 1, wherein the causal signal includes a linear combination of a set of basis functions.

4. The method of claim 3, wherein the basis functions are weighted by respective coefficients, wherein the coefficients are determined such that the causal signal approximates a difference signal between the second spectrum and the first spectrum.

5. The method of claim 4, wherein the coefficients are determined with a least square optimization method such that the difference between the second spectrum and the first spectrum is minimized.

6. The method of claim 4, wherein the coefficients are determined by absolute error control in a predetermined spectrum range.

7. The method of claim 1, wherein the causal signal has a value equal to the difference between the second spectrum and the first spectrum at zero frequency.

8. The method of claim 1, wherein calculating the first time-domain impulse response from the first spectrum is performed through an inverse Fourier transform.

9. The method of claim 1, wherein the first spectrum represents S parameters of an electrical circuit.

10. A non-transitory computer-readable medium storing instructions, which, when executed by a processor, perform a method for calculating a time-domain impulse response, wherein the method comprises:

calculating a first time-domain impulse response from a first spectrum in the frequency domain, wherein the first spectrum is a band-limited spectrum;

removing a non-causal portion of the first time-domain impulse response to obtain a second time-domain impulse response;

calculating a second spectrum of the second time-domain impulse response;

modifying, by the processor, the second spectrum by adding a causal signal such that a difference between the second spectrum and the first spectrum is reduced; and calculating, by the processor, the second time-domain impulse response with improved causality from the modified second spectrum.

11. The non-transitory computer-readable medium of claim 10, wherein removing a non-causal portion of the first time-domain impulse response to obtain a second system time-domain impulse response includes removing the portion of the first time-domain impulse response where t<0.

12. The non-transitory computer-readable medium of claim 10, wherein the causal signal includes a linear combination of a set of basis functions.

13. The non-transitory computer-readable medium of claim 12, wherein the basis functions are weighted by respective coefficients, wherein the coefficients are determined such that the causal signal approximates a difference signal between the second spectrum and the first spectrum.

14. The non-transitory computer-readable medium of claim 13, wherein the coefficients are determined with a least square optimization method such that the difference between the second spectrum and the first spectrum is minimized.

15. The non-transitory computer-readable medium of claim 13, wherein the coefficients are determined by absolute error control in a predetermined spectrum range.

16. The non-transitory computer-readable medium of claim 10, wherein the causal signal has a value equal to the difference between the second spectrum and the first spectrum at zero frequency.

17. The non-transitory computer-readable medium of claim 10, wherein calculating the first time-domain impulse response from the first spectrum is performed through an inverse Fourier transform.

18. The non-transitory computer-readable medium of claim 10, wherein the first spectrum represents S parameters of an electrical circuit.

19. A computer-implemented method for calculating a time-domain impulse response, comprising:

extrapolating a first band-limited spectrum to obtain an extrapolated spectrum;

calculating a first time-domain impulse response from the extrapolated spectrum;

removing a non-causal portion of the first time-domain impulse response to obtain a second time-domain impulse response;

calculating a second spectrum of the second time-domain impulse response;

modifying the second spectrum by adding a causal signal such that a difference between the second spectrum and the first band-limited spectrum is reduced; and calculating the time-domain impulse response from the modified second spectrum.

20. The method of claim 19, wherein extrapolating the first spectrum includes using a rational extrapolation function to extrapolate the first spectrum.

21. A computer-implemented method for calculating a time-domain impulse response, comprising:

receiving measurements of a characteristic of an electrical circuit;

generating a first spectrum based on the measurements;

extrapolating the first spectrum to obtain an extrapolated spectrum including an original portion and an extrapolated portion;

calculating, by a processor, a first time-domain impulse response from the extrapolated spectrum;

removing a non-causal portion of the first time-domain impulse response to obtain a second time-domain impulse response;

compensating a second spectrum obtained from the second time-domain impulse response; and calculating, by the processor, the time-domain impulse response from the compensated spectrum.

22. The method of claim 21, wherein compensating a second spectrum obtained from the second time-domain impulse response includes:

calculating a second spectrum of the second time-domain impulse response; and modifying the second spectrum by adding a causal signal such that a difference between the second spectrum and the first spectrum is reduced.

23. The method of claim 21, wherein extrapolating the first spectrum includes using a rational extrapolation function to extrapolate the first spectrum.

* * * * *